J. Hope.
Inking App's for Printing.
N⁰ 21,723.   Patented Oct. 5, 1858.
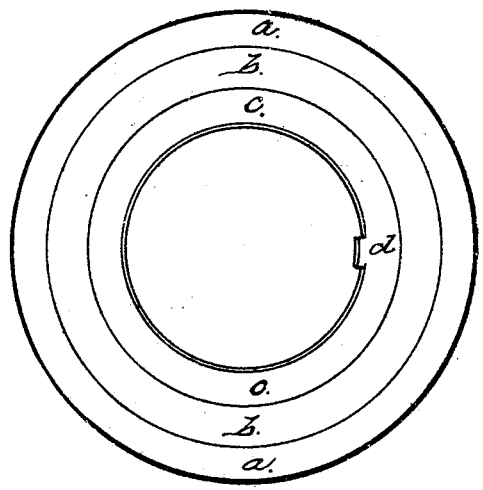
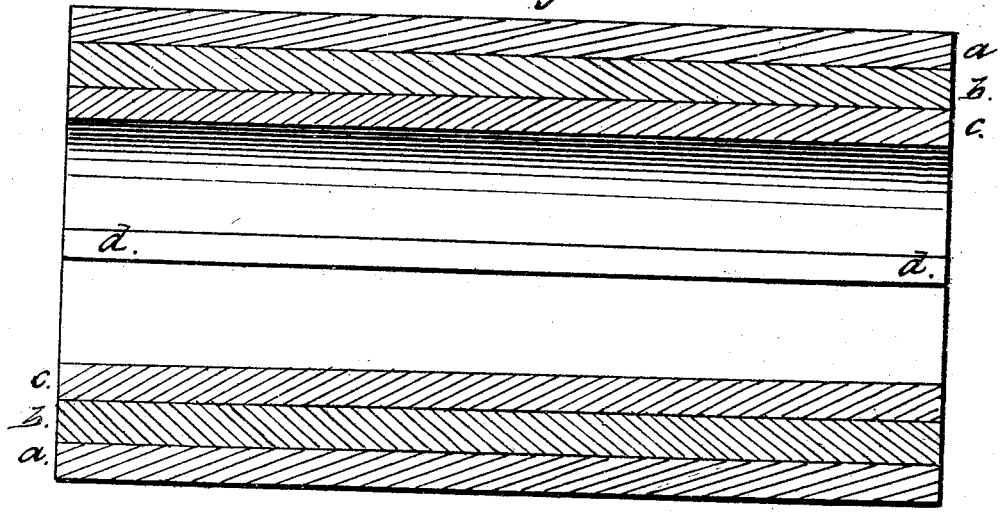

UNITED STATES PATENT OFFICE.

JOHN HOPE, OF PROVIDENCE, RHODE ISLAND, ASSIGNOR TO HIMSELF AND THOMAS HOPE, OF SAME PLACE.

ROLLER FOR CALICO-PRINTING.

Specification of Letters Patent No. 21,723, dated October 5, 1858.

*To all whom it may concern:*

Be it known that I, JOHN HOPE, of Providence, in the county of Providence and State of Rhode Island, have invented an Improved Calico-Printing Roller; and I do hereby declare that the same is fully described and represented in the following specification and the accompanying drawings, of which—

Figure 1, exhibits an end view, and Fig. 2, a longitudinal section of one of the said rollers.

The engraved cylinders of calico printing machines have heretofore been constructed entirely of copper, each being in one solid piece or tube having a bore made slightly tapering and to fit with great accuracy upon a mandrel or shaft belonging to or making part of the printing machine. In consequence of this, and their great weight, they have been very costly, so much so, that few print works can afford to keep any very large quantity of engraved cylinders, as the capital invested in them would be too much to be suffered to lie idle. Rather than keep many rollers on hand, the calico printers generally, procure as few as they con conveniently make answer their purpose, and after using them awhile, turn them down and reëngrave other patterns upon them, thus losing the engravings previously upon them. In consequence of this, there is not only a loss in copper, but each cylinder or roller so treated becomes diminished in its diameter every reduction of it tending to diminish its utility.

I have sought to make a printing cylinder which, while it may possess all the advantage of a large diameter can be constructed of much less weight and cost than a copper cylinder of the same size.

My invention I term a composite printing roller and in carrying it out or in other words, in constructing it in what I have conceived to be the best manner, I employ, first, a copper or brass shell or tube, or one made of the metal of which calico printers' rollers are generally constructed, such being shown at $a$ in Figs. 1 and 2, of the drawings above mentioned; second, a foundation tube $b$, made of cast iron, and not only of an external diameter to correspond with the internal diameter of the copper tube $a$, but having an internal diameter about one inch larger than the mean external diameter of the mandrel on which the roller is to be fitted; third, a mandrel connection, $c$, which I generally make from that well known vulcanized caoutchouc composition which, when cold becomes solidified or indurated, such composition being composed of coal-tar, pitch, sulfur and caoutchouc, either alone or with other matter, and being that from which combs, walking canes, toys and various articles are now made and on sale in the market. This composition can be softened by heat and cast or applied around a mandrel and subsequently vulcanized thereon. Instead of this composition, there are various other compositions which may be employed to make the mandrel connection. What is termed "type metal" may be used, although not with the advantages of the said caoutchouc composition.

In making a calico printer's rollers of the improved kind, the forming mandrel is to be placed concentrically or thereabout within the foundation tube, and the material to constitute the mandrel connection, $c$, should be applied or cast between the two so as to fill the entire space between them, and form when in a vulcanized and hardened state, a tube. In order to prevent the cast iron foundation tube from being moved or turned on its caoutchouc connection, the inner surface of the former may be scored, indented or otherwise rendered rough, or it may have sundry projections. As the mandrel is usually constructed with a groove extended longitudinally throughout that part of its outer surface which is to be within the cylinder or roller, the caoutchouc composition will run or be forced into such groove so as to form a feather or spline $d$, corresponding in shape with that of the groove. This spline or feather serves to prevent the rotation of the roller on the arbor or mandrel, or in other words, causes the cylinder to rotate with the mandrel. After the cast iron foundation tube has thus been applied to the mandrel it should receive the copper covering or shell $a$. This may be drawn or driven on it or be rolled upon it or be made and fixed to it by the electrotype process. Afterward, the mandrel may be placed in a lathe and the copper shell be turned down so as to bring its outer surface concentric with the axis of the mandrel.

In some cases it is possible that the cast iron foundation cylinder may be dispensed with the copper tube and separate mandrel connection being used, in which case the mandrel connection would be formed or cast directly against the inner surface of the copper tube while surrounding the mandrel. This, however, I do not consider to be so useful a mode of making the composite roller, for the cast iron foundation is cheaper and better, in many respects than the caoutchouc composition. After the composite roller has been made a few slight blows on one end of it, will suffice to separate it from the mandrel.

It should be borne in mind that the rotary mandrels of calico printing machines are generally made of one size or of certain fixed sizes corresponding with that or those of the forming mandrel or mandrels employed in the process of manufacturing the printing roller. The object of this is to enable a roller, whenever made to fit a mandrel of any calico printing machine. Thus it will be seen, that by the above described mode of making the mandrel connection within the cast iron foundation tube or within the copper tube when either has a forming mandrel arranged within it, the said connection can be made with great accuracy and little cost in comparison with that of boring the common copper rollers or fitting them to the mandrel.

I have reason to believe that a composite calico printing roller of the kind described can be made at one third the expense of a copper roller of the same size. Its weight will not be near as great as the copper roller. Consequently in handling it or moving it from place to place less labor will be required, comparatively speaking. Its diminished cost will enable the calico printers to keep on hand a larger stock of rollers, and thus save much of the expense and loss incurred in turning down and reëngraving their cylinders, when made entirely of copper or brass in the usual way.

I am aware of the jewelry roller, which forms the subject of the United States Patent No. 21039. My invention differs essentially therefrom, because the outer shell of my roller is not to be hardened by being heated and afterward suddenly cooled on its cast-iron carrier or cylinder encompassing the arbor or shaft, for the great heat of the outer shell would so heat the shaft connection composition or shell as to either injuriously soften or melt it. Furthermore, another material difference is in the nature and character of the shaft connection, as well as in the mode of effecting the same, it being not only formed by the process of casting it within a shell or tube and around a grooved and slightly tapering cylindrical shaft, but made of a caoutchouc composition or a material suitable for the purpose and such as will admit of being cast or molded between the arbor and tube so as to form a proper connection therefor of the kind described.

What therefore I claim is—

My said new manufacture of calico printing roller, made substantially as described, viz, of the copper shell, $a$, cast metal foundation tube $b$, and with a mandrel connection cast in the metallic shell or tube and on an arbor or mandrel in manner and of a material substantially as specified.

In testimony whereof, I have hereunto set my signature.

JOHN HOPE.

Witnesses:
WILLIAM F. ENGLEY,
S. F. CARPENTER.